Jan. 1, 1952     N. E. DIETZ     2,580,529
SHAFT SEAL
Filed Aug. 11, 1949
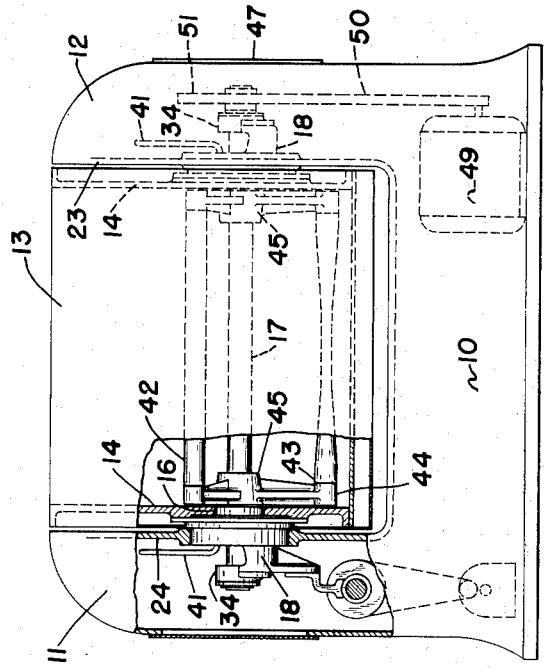
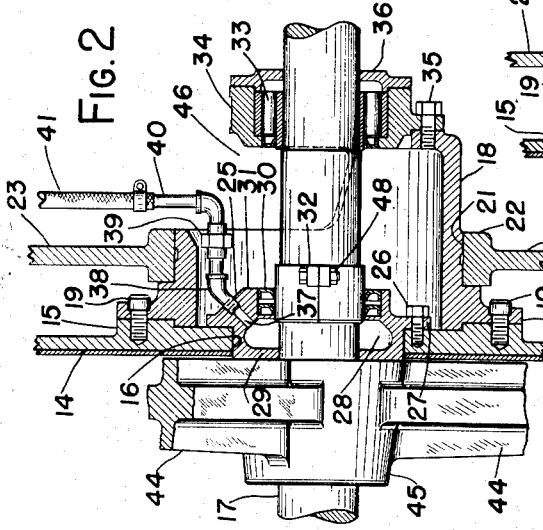
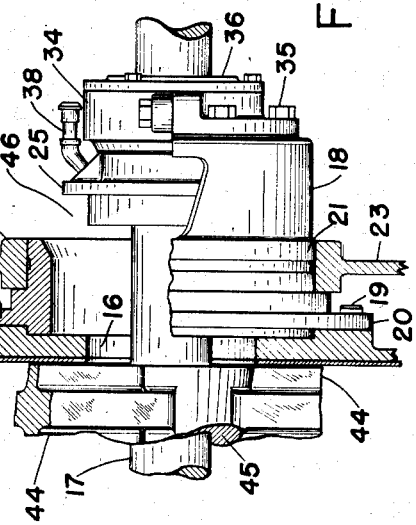
INVENTOR.
NORMAN E. DIETZ
BY Otto Moeller
Attorney

UNITED STATES PATENT OFFICE 2,580,529

SHAFT SEAL

Norman E. Dietz, York, Pa., assignor to Read Standard Corporation, a corporation of Delaware Application August 11, 1949, Serial No. 109,759

2 Claims. (Cl. 259—109)

This invention relates to dough mixers and more particularly to the sealing means for the agitator shaft where it projects through the ends of the mixer bowl.

Dough mixing machines of the horizontal type have a bowl, U-shaped in transverse cross section, in which is provided an agitator mounted for rotation on a shaft, the ends of which project through the end walls of the mixer bowl.

The ingredients introduced into the mixing bowl include liquid as well as dry materials and it is essential to have a tight seal at the clearance around the agitator shaft where it extends through the end walls of the mixing bowl, in order to prevent leakage of liquid.

A particularly effective seal including a pressure chamber is shown in United States Patent No. 2,340,022 issued January 25, 1944, to T. J. Shellenberger, and the present invention contemplates an improvement in a seal of this type.

The sanitation laws of certain States require periodic inspection of the ends of the agitator hub and it is an object of this invention to provide improved means permitting visual inspection of the ends of the agitator hub of a horizontal mixer with a minimum of dismantling or disassembly of the mixer.

Another object of the invention is to provide improved sealing means that is easily and conveniently moved as a unit from sealing position to expose the ends of the agitator hub permitting visual inspection thereof from a position outside the mixer.

Other objects and advantages will be apparent from the following detailed description of a preferred embodiment of the invention, reference being had to the accompanying drawing, in which:

Figure 1 is a view in elevation, with parts broken away and shown in section, of a dough mixing machine embodying the present invention;

Figure 2 is an enlarged section of a portion of the dough mixing machine showing the movable sealing means in sealing position; and Figure 3 is an enlarged section of a portion of the dough mixing machine with the sealing means shown in elevation and moved to a position permitting inspection of the end of the agitator hub.

Referring to the drawing, the dough mixing machine comprises a casing consisting of a base 10 and hollow upright standards 11 and 12. Between the standards 11 and 12 and above the base 10 is a mixing bowl 13 of well known construction, mounted to be tilted from its mixing position, as shown in Figure 1, to permit discharge of the dough.

In order to rotatably mount the bowl 13, each end wall 14 is formed with a boss 15 having an opening 16 therein of considerably larger diameter than the diameter of the agitator shaft 17.

A cylindrical housing 18 open at its inner end has a diameter larger than the diameter of the opening 16 and is arranged with its inner end abutting the end wall 14 of the bowl 13. The housing 18 is rigidly secured to the end wall 14 by suitable means, as by bolts 19, extending through the annular flange 20 on the inner side of the housing 18 and into the boss 15.

A portion of the outer circumference of the housing 18 is arranged to form a trunnion 21 for the bowl 13. The trunnion 21 is journaled in a bearing 22 mounted in or formed with the inner upright wall 23 of the standard 12. The inner upright wall 24 of the standard 11 is provided with a bearing similar to bearing 22 and the left side of the bowl 13, as shown in Figure 1, is provided with a similar arrangement of parts as the right side.

A cylindrical sealing unit or casing 25 surrounds the agitator shaft 17, the outer portion thereof being disposed in the housing 18 while the inner portion is disposed in and closes the annular opening 16 between the shaft 17 and the portion of the mixer end wall 14 that defines the opening 16. The casing 25 is rigidly secured to the mixer end wall 14 by means of bolts 26 extending through an annular flange 27 formed with the casing 25 into the mixer end wall 14.

The casing 25 provides an annular chamber 28 surrounding the shaft 17, and the inner end of chamber 28 is closed by the inner annular plate-like wall 29 of the casing 25. In order to permit free rotation of the shaft 17, a little clearance is provided between the wall 29 and the shaft 17. The outer end of the chamber 28 is closed by means of ring packing 30 mounted in an annular seat formed in the outer end wall 31 of the casing 25. The ring packing 30 fits about a split collar 32 secured to the shaft 17.

The outer end of the agitator shaft 17 is journaled in a roller bearing 33 mounted in an annular plate 34 fastened to the outer end of the housing 18 by bolts 35. The end of the bearing 33 is closed by a cover plate 36 which is detachably secured to the plate 34 in any suitable manner.

In order to introduce air under pressure into the chamber 28, the end wall 31 of the sealing casing 25 is formed with a threaded opening 37 into which is threaded one end of a pipe 38. A union 39 connects pipe 38 with piping 40 which includes a flexible hose section 41 adapted to be connected with a source of air under pressure (not shown).

Mounted on the shaft 17 and disposed within the bowl 13 is an agitator 42 of well known type. The agitator comprises a plurality of kneading or mixing bars 43 spaced from and extending parallel with the agitator shaft 17. The mixing bars 43 are supported at their ends on the outer ends of the arms 44 radiating from the agitator hubs 45 which are secured for rotation with the shaft 17.

By introducing air under pressure into the chamber 28 greater than the pressure within the mixing bowl 13, the liquid in the bowl is prevented from leaking outwardly through the clearance between the shaft 17 and the edge of the inner end wall 29 of the sealing casing 25 that defines the opening about the shaft 17. Air pressure seals have been found very effective for dough mixers as set forth in United States Patent 2,340,022 referred to previously.

It is desirable at periodic intervals to inspect the ends of the hubs 45 of the agitators 42 and in some states such inspections are required by law. The construction and arrangements of parts constituting my air sealing device provide for convenient inspection of the ends of the hubs 45 from a vantage point outside the mixer and with a minimum of disassembly.

For purpose of inspection, the outer upper portion of the housing 18 including adjacent portions of its cylindrical wall and its rear wall is cut away to form an inspection opening 46.

When it is desired to make an inspection, the cover plate 47 of the standard 12 is first removed. Access being then had to the interior of the housing 18 through the opening 46, the split collar 32 is removed by unfastening and removing the bolts 48 which normally secure the collar 32 to the shaft 17.

The bolts 26 which secure the sealing unit or casing 25 in place are then removed. The casing 25 is then pulled outwardly into the housing 18 until the union 39 is accessible through the opening 46, after which the union connection is broken. The casing 25 can then be moved outwardly into the housing 18 to the position shown in Figure 3. The length of the housing and the portion thereof that is cut away to form the inspection opening 46 are of course so selected and proportioned so that when the casing 25 is moved to the position shown in Figure 3, a sufficient portion of the opening 46 is available to permit visual inspection of the end of the agitator hub 45 through the opening 16 in the mixer end wall 14.

The end of the agitator shaft 17 beyond the bearing 33 carries a pulley 51 which is connected to a motor 49 in the base 10 by means of a belt 50, whereby motion is transmitted to the agitator 42.

I claim:

1. A shaft sealing structure for mixers of the type including a mixing chamber and an agitator mounted on a rotatable agitator shaft that extends through an oversize opening in an end wall of the mixing chamber, said structure comprising a housing secured to said end wall in surrounding relation with the oversize opening therein and encompassing the extension of said shaft, a chambered pressure sealing casing surrounding said agitator shaft and having axial movement thereon, said casing having the outer portion thereof conforming to the contour of said oversize opening of said mixing chamber, and said casing having said outer portion thereof received in said oversize opening and engaging the wall portion defining said opening, the overall width of said sealing casing measured axially of said shaft being substantially less than the inside width of said housing measured axially of said shaft, said casing being movable out of said opening and along said shaft within said housing to expose said oversize opening, and said housing having a portion of the wall thereof cut away to form an inspection opening for visually inspecting the end of said agitator through said oversize opening.

2. A structure according to claim 1 in which the chambered pressure sealing casing is provided with a port, and a supply line leading from a source of fluid pressure extends through the inspection opening in the housing and communicates with said port for supplying fluid under pressure to the chamber in said sealing casing.

NORMAN E. DIETZ.

REFERENCES CITED

The following references are of record in the file of this patent:

UNITED STATES PATENTS

| Number | Name | Date |
| --- | --- | --- |
| 2,340,022 | Shellenberger | Jan. 25, 1944 |

FOREIGN PATENTS

| Number | Country | Date |
| --- | --- | --- |
| 433,556 | Great Britain | Aug. 16, 1935 |